UNITED STATES PATENT OFFICE.

ADOLPH RASMUS LEERBECK, OF COPENHAGEN, DENMARK.

PROCESS OF MAKING DIETARY MALT-POWDER.

SPECIFICATION forming part of Letters Patent No. 390,239, dated October 2, 1888.

Application filed February 7, 1888. Serial No. 263,281. (No specimens.) Patented in England April 29, 1887, No. 6,285.

*To all whom it may concern:*

Be it known that I, ADOLPH RASMUS LEERBECK, of Copenhagen, in the Kingdom of Denmark, have invented a certain new and useful Improved Process for Producing Albumen-Maltose or Dietary Malt-Powder for Food, (for which a patent was granted to me in England, dated April 29, 1887, No. 6,285,) of which I declare the following to be a true and correct specification.

My invention relates to an improved process for producing albumen-maltose, in which the wheat-flour is mixed with water to dough, this dough allowed to remain for two or three hours in water, then cut into pieces and laid in a cleansing apparatus, which is so constructed that water flows slowly continually over the said dough, which is worked at the bottom of the said cleansing apparatus by an oblong milled roller moving to and fro. By this process the starch, grain, and bran are separated, which, swollen by the action of the water, are conducted through perforated disks of metal attached to the sides of the apparatus, in which there still remains the so-called "gluten," (vegetable glue.) This latter substance is tough and plastic, and is repeatedly—about ten times—passed between iron rollers until it can be rolled into plates. These are dried at a temperature of 40° centigrade, crushed, and ground into fine powder. According to the examination and analysis carried out in the chemical laboratory of Professor Von Stein, in Copenhagen, this gluten flour contains the following:

| | |
|---|---|
| Water | 11.02 per cent. |
| Gluten | 70.31 per cent. |
| Fat | 2.56 per cent. |
| Starch | 13.70 per cent. |
| Nitrogenous matter | 1.69 per cent. |
| Non-organic matter | 0.72 per cent. |
| | 100.00 per cent. |

The fluid flowing from the cleansing apparatus, consisting of fine starch grains and bran that have been swollen in water, is conducted over a movable sieve covered with such fine gauze that all the bran is separated out by sifting. The flour suspended in the water is pumped into receptacles, where it is allowed to remain until it has settled. The water is now drawn off by means of a siphon or other appropriate apparatus, and the flour sediment conducted to a centrifugal machine making about one thousand revolutions a minute. On this centrifugal machine a sour yeast is separated out consisting of impure flour sediment mixed with dissolved vegetable glue. This flour sediment, only superficially purified, is again cleansed and conducted to a centrifugal machine making about fifteen hundred revolutions a minute. Here the last particles of impurity are separated out and flour sediment obtained free from acid and chemically pure. This is stirred in water and heated till it forms a paste. In this condition, under the influence of diastase, the said flour sediment is converted at a temperature of 65° centigrade into maltose and dextrose. To the pure solution of the aforesaid sediment, which contains fifteen per cent. of maltose and five per cent. dextrine, I now add 0.05 per cent. albuminous matter, (gluten,) 0.50 per cent. chloride of sodium, and 0.50 per cent. phosphate of lime. The whole preparation is then subjected to evaporation and dried, whereupon it is ground into powder and stored in tins ready for use. A preparation is then obtained which consists of:

| | |
|---|---|
| Water | 3.00 per cent. |
| Albuminous matter, (containing nitrogen, 2.41) | 15.06 per cent. |
| Maltose | 48.78 per cent. |
| Starch dextrine, &c | 29.63 per cent. |
| Non-organic material, Phosphate of lime, (containing phosphoric acid, 0.61,) chloride of sodium | 2.73 per cent. |
| | 100.00 per cent. |

As this preparation contains a greater quantity of albuminous matter than wheat-flour, and the flour sediment that has passed into the preparation in converted form, after the described cleansing process, amounts to fifty per cent. of the whole preparation, it follows herefrom that in the manufacture of albumen-maltose in the manner herein described considerable layers of flour sediment accumulate, which may be used as follows: From the yeast separated out on the first centrifugal machine a second-quality starch is abstracted, applicable for finishing purposes. The remaining chemically-pure flour sediment is brought into the market as first-quality wheat starch on account of its purity. The same is especially valuable in chemists' laboratories as amylum triticum, as well as in households and in the manufacture of confectionery.

This preparation is distinguished from malt extract on account of its containing a larger amount of vegetable albumen by its dry powder form, as well as through the method of producing it, because, as herein described, it is obtained from the completely-purified flour sediment and the dissolved vegetable gluten from the wheat-flour.

Having now particularly described and ascertained the nature of my said invention, what I claim is—

The process, as herein described, for producing albumen-maltose or dietary malt-powder for food, consisting in mixing water and wheat-flour to a dough, allowing this dough to remain in water for about two hours, then cutting into pieces and treating same with an oblong milled roller in a cleansing apparatus, subsequently conducting the starch grains and bran separated thereby over a gauze sieve, pumping the suspended flour into receptacles, drawing off the water by a siphon or other suitable apparatus, then conducting the flour sediment to a centrifugal machine, whereby an impure flour sediment mixed with dissolved vegetable glue is separated out, again cleansing this sediment and reconducting the same to a centrifugal machine to obtain a chemically-pure flour sediment, adding to this sediment 0.05 per cent. albuminous matter, (gluten,) 0.50 per cent. chloride of sodium, and 0.50 per cent. phosphate of lime, forming to a paste by stirring in water, converting this mixture at 65° centigrade and under the influence of diastase into maltose and dextrose, subjecting this compound to evaporation, drying the same, and subsequently grinding into powder, substantially as and for the purpose set forth.

In witness whereof I have hereunto signed my name in the presence of two subscribing witnesses.

ADOLPH RASMUS LEERBECK.

Witnesses:
FR. BOUFE,
K. HOFFMANN.